(12) United States Patent
Amendola

(10) Patent No.: US 6,468,694 B1
(45) Date of Patent: *Oct. 22, 2002

(54) HIGH ENERGY DENSITY BORIDE BATTERIES

(75) Inventor: Steven Amendola, Ocean, NJ (US)

(73) Assignee: Millennium Cell, Inc., Eatontown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/162,428

(22) Filed: Sep. 28, 1998

Related U.S. Application Data

(63) Continuation-in-part of application No. 08/829,497, filed on Mar. 27, 1997, now Pat. No. 5,948,558.

(51) Int. Cl.[7] .................. H01M 000/58; H01M 12/06
(52) U.S. Cl. .................. 429/218.1; 429/27; 429/105; 429/199
(58) Field of Search .................. 429/50, 101, 199, 429/218.1, 105, 27

(56) References Cited

U.S. PATENT DOCUMENTS

| | | |
|---|---|---|
| 1,913,373 A | 6/1933 | De Golyer |
| 3,511,710 A | 5/1970 | Jung et al. |
| 4,107,401 A | 8/1978 | Goodson et al. ............ 429/101 |
| 4,288,506 A | 9/1981 | Coetzer et al. ............. 429/199 |
| 4,492,741 A * | 1/1985 | Struthers ................ 429/105 X |
| 4,614,637 A | 9/1986 | Boncoeur et al. |
| 4,659,687 A | 4/1987 | Cymbaluk .................. 502/207 |
| 5,275,781 A | 1/1994 | Logan .................... 423/297 X |
| 5,571,637 A | 11/1996 | Idota |
| 5,804,329 A * | 9/1998 | Amendola .............. 429/105 X |
| 5,948,558 A * | 9/1999 | Amendola .................... 429/50 |

FOREIGN PATENT DOCUMENTS

| | | |
|---|---|---|
| EP | 0313306 | 4/1989 |

* cited by examiner

*Primary Examiner*—Stephen Kalafut
(74) *Attorney, Agent, or Firm*—Gibbons, Del Deo, Dolan, Griffinger & Vecchione

(57) ABSTRACT

Borides generally can produce a cell with a high energy density. High power densities are also achievable using borides that are reasonably good conductors of electricity. High density is important to achieve high energy density. Another important factor is lower molecular weight per available electron. The borides generally provide a favorable balance of these factors compared to a number of other materials, such as lithium or zinc. Individual borides have other important characteristics. Titanium diboride is safe. The inclusion of a halide, particularly fluoride, in the anodic storage medium signficantly improvers performance.

42 Claims, 1 Drawing Sheet

HIGH ENERGY DENSITY BORIDE BATTERIES

CROSS-REFERENCE TO RELATED APPLICATION

This application is a continuation in part of my application U.S. Pat. No. 08/829,497, filed Mar. 27, 1997, now U.S. Pat. No. 5,948,558, which is hereby incorporated by reference.

FIELD OF THE INVENTION

This invention is in the general field of electrochemical conversion using cells, particularly high energy density batteries.

BACKGROUND OF THE INVENTION

Many devices that require electricity from a battery are limited in usefulness by the battery's lifetime. Both weight and size (in other words, energy density) can be limiting factors on battery life, particularly for small devices. In particular hearing aids and many other devices would be enhanced by increasing the battery's energy density. For example, many devices could be further miniaturized if a smaller battery that gave reasonable energy density were available.

Accordingly, there is a general need to generate as much electrical energy as possible from a battery having a limited volume.

SUMMARY OF THE INVENTION

I have discovered that the use of certain borides can produce a high energy density cell. High power densities are also achievable, for example, by using borides that are reasonably good conductors of electricity. I have further discovered that the performance of borides such as titanium boride is signigicantly improved by adding a halide, such as a fluoride, in the electrolyte system. Without wishing to bind myself to a specific theory, I conclude that even though the borides or the resulting borates in question may have desirable properties,—e.g., high energy density and high conductivity and aqueous compatibility, if the resutling borate (e.g., titanium borate) is very insoluble, it can coat the boride and thereby degrade battery performance. In particular, such coating reduces the available power and it causes the. battery to fail prematurely, before substantially all of the material is oxidized. Batteries having a halide-(particularly fluoride-) containing electrolyte will perform substantially better. Again, without binding myself to a particular theory, if fluoride ion is present in this system, the highly soluble complex anions of titanium hexafluoride and boron tetrafluoride are formed. These soluble ions now diffuse away from the boride particle and allow further reaction until the boride is more effectively Accordingly one aspect of the invention generally features a battery comprising an anode and a cathode in electrical communication; the anodic electrochemical storage medium comprises as a reduced species: a) boron; b) at least one reduced boron-containing compound; or c) both. The reduced species is oxidizable to an oxidized boron-containing compound in a reaction which yields an electric current, and the oxidized boron-containing compound is soluble in the electrochemical storage medium as the battery is discharged.

The battery is particularly adapted to the use of aqueous systems for the storage medium. Particularly preferred reduced boron-containing compounds are borides. As noted, it is particularly useful to include a halide (e.g.. a fluoride such as may be provided by sodium fluoride) in the the anodic medium. Alternatively, or in combination with the fluoride, the halide may be chloride (e.g., sodium or potassium chloride).

Preferred borides are conductive to enhance the overall conductivity and therefore the deliverable current. Transition metal borides are particularly preferred. Titanium diboride and vanadium diboride are preferred.

Preferred cathodes comprise a structure that is exposed to oxygen (e.g. to air), such as those in which cathode is also exposed to an aqueous electrolyte, and oxygen is reduced to —$OH^-$.

The anodic medium may further comprise a borohydride in addition to boron or the reduced boron-containing compound. It may also comprise a metallic boride such as FeB or $NiB_2$. The anodic storage medium may also further comprise a conductivity enhancer such as graphite. The enhancer may itself be oxidized to provide addition current during oxidation of the reduced boron-containing compound, or it may be inert. The anodic medium may comprises a combination of borides. For example, mixtures of the borides are contemplated to achieve desired combinations of energy density and conductivity, depending on the application. For example, a low conductivity boride may be mixed with a higher conductivity boride to achieve a desired energy density and conductivity.

The oxidized boron-containing compound may be a boron halide or a boron oxyhalide, a borate or polyborate. Preferably, the the oxidized boron-containing compound is conductive.

Other borides that may serve as the reduced boron-containing compound include aluminum borides. See also, table 1.

The anodice stoarage medium may further comprise EDTA, in addition to the boron or reduced boron-containing compound. The oxidized boron-containing compound may include a metal oxide and a borate. The oxidized boron-containing compound may contains a combination of corresponding metal oxides, halides and oxyhalides.

Typically the storage medium is an aqueous, but the invention may also be used in non-aqueous systems. Another way to enhance conductivity and thereby increase current is to use a conductive electrolyte. Conductivity enhancers, such as borohydrides or metallic borides, may also be added to the medium to both enhance conductivity and to contribute, to some extent, to electrical output. Alternatively, inert conductivity enhancers, such as graphite or other conductive carbon formulations may be used.

The electrochemical reaction is improved by alkaline pH, so the storage medium preferably has a pH above 8.5, and most preferably it has a pH above 11.0. Typically, an alkali metal hydroxide is added to the storage medium to provide conductivity as well as to control pH.

As an alternative to the so-called air or breathing cathode, the cathode may include an oxygen-containing oxidizing compound such as compounds is selected from ferrates, $MnO_2$, $CrO_3$, $KMnO_4$, $LiCoO_2$, NiOOH, peroxides, perhalates, perchlorate, chlorates, bromates, perbromates, iodates, periodates, hypochlorites and chlorites.

Alternatively, the cathode may comprise a non-oxygen containing oxidizing compound, such as a high valency metal or an interhalogen or a metal-halide in which the metal can be reduced to a lower valence.

The invention also features methods of generating a current by contacting a load to any of the above described batteries.

Without binding myself to a specific mechanism of action or limiting myself to one specific advantage of the invention, high (mass) density is important to achieve high energy density. Another important factor is lower weight per available mole of electrons. The borides generally provide a favorable balance of these factors compared to a number of other materials, such as lithium or zinc.

Moreover, individual borides have other important characteristics. Titanium diboride is safe and environmentally acceptable—the final products of titanium boride discharge in a basic medium are essentially borax and titanium dioxide, both of which have a relatively low environmental impact. Even the staring materials, the borides themselves, are somewhat refractory and also relatively benign environmentally. Other borides, such as vanadium boride with a high density of 5.1 g/cc, may be used.

DESCRIPTION OF THE PREFERRED EMBODIMENTS

Figure 1:
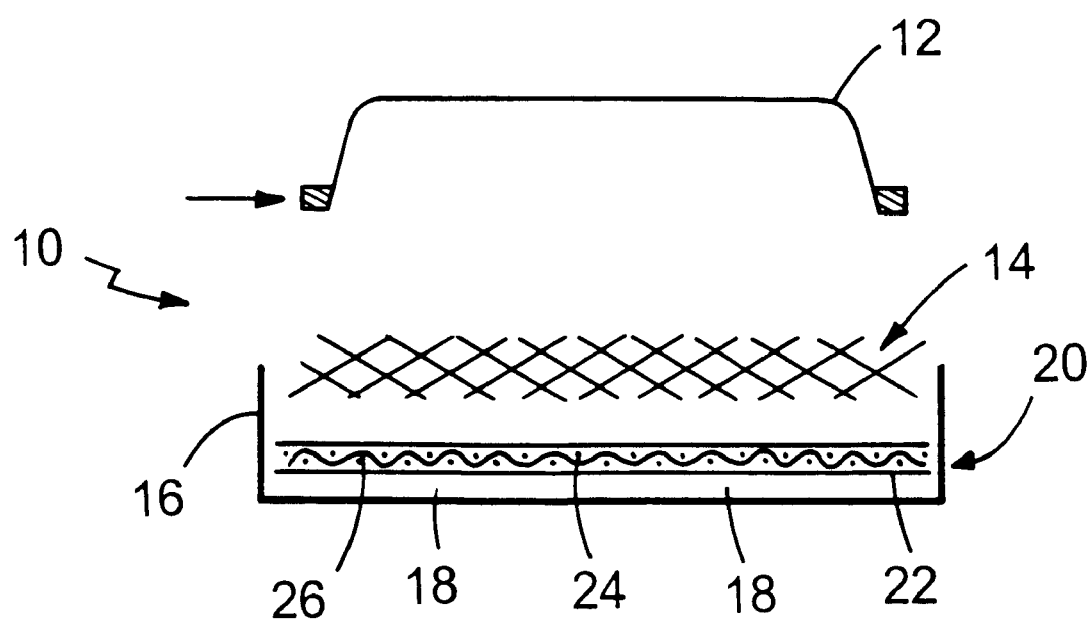
FIG. 1 is a diagrammatic view, in section, of a single use battery according to the invention.

Boride-containing anode materials provide high energy. When combined in a battery, e.g., with an air breathing electrode as the cathode, high energy density can be achieved. Other suitable oxidizers may also be utilized as a cathode in a battery that has a boride-containing cathode.

Using titanium diboride as an example, the half reactions taking place in the battery are as follows:

$$2TiB_2 + 20OH^- + 20e^- = 2TiO_2 + 2B_2O_3 + 10H_2O \text{ (anode)} \quad (1)$$

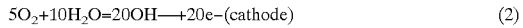

$$5O_2 + 10H_2O + 20e^- = 20OH^- \text{ (cathode)} \quad (2)$$

These two reactions result in the net reaction of:

$$2TiB_2 + 5O_2 = 2TiO_2 B_2O_3 \text{(net)} \quad (3)$$

While not predicting 100% efficiency, it should be noted that the amount of energy (known as ΔG) theoretically available from reaction (3)—over 4,000 kJ per 2 moles of titanium diboride (about 139.4 grams)—is very high, more than 28 Megajoules per kilogram and more than 140 megajoules per liter.

The chemistry of the boride compounds is complex. There are many non-stoichiometric compounds of boron with the elements. For example, while equations (1) and (3) use $TiB_2$, the boride can be any boride or mixture of borides, including elemental boron. The anode may also include other compounds which would enhance any of the performance parameters of the battery, as desired.

Examples of other borides that are suitable for use in the battery generally fall into the following classes of compounds:

A. Alkali metal borides: Group Ia (group 1) borides;

B. Alkaline metal borides: Group IIa (group 2) borides;

C. Group IIIa (Group 11) borides;

D. Group IVa (Group 12) borides;

E. Transition metal borides including groups 1b to 8b (groups 3 to 10);

F. Lanthanide and actinide group borides More specifically the compounds include those listed below.

TABLE 1

Borides

Lithium borides; Beryllium boride; Boron; Boron carbides; Boron nitrides; Sodium borides; Magnesium borides; Aluminum borides; Silicon borides; Phosphorus borides; Potassium borides; Calcium borides; Scandium borides; Titanium borides; Vanadium borides; Chromium borides; Manganese borides; Iron borides; Cobalt borides; Nickel borides; Copper borides; Gallium borides; Arsenic Borides; Rubidium borides; Strontium borides; yttrium borides; zirconium borides; niobium borides; molybdenum borides; technetium borides; ruthenium borides; rhodium borides; palladium borides; silver borides; cesium borides; barium borides; lanthanum borides; cerium borides; praseodymium borides; neodymium borides; promethium borides; samarium borides; europium borides; gadolinium borides; terbium borides; dysprosium borides; holmium borides; erbium borides; thulium borides; ytterbium borides; lutetium borides; hafnium borides; tantalum borides; tungsten borides; rhenium borides; osmium borides; iridium borides; platinum borides; thorium borides; uranium borides; plutonium borides.

The existence of useful non-stoichiometric boron compounds means that the ratio of the elements represented as $E_xB_y$ will vary considerably without deviating from the teachings of this patent. Elemental boron as well as the other element (E) may be added as a components of the anode.

For borides that react with water, the system used is non-aqueous system or it is stored in a mode which prevents activation until the electrolyte is allowed to come into contact with the boride. Additionally, as a general rule for applying the above list, the energy density will tend to decrease going down and to the right-hand side of the periodic chart. Reactivity with water generally tends to occur only with the first two columns on the left of the chart. Higher electrically conductivities tend to be found in the center of the chart, with many of the transition metal borides exhibiting high or even metallic conductivities. It is the very wide range of properties of these compounds that gives the wide range of diversity of the finished batteries.

A wide array of electrolytes and oxidizers may be incorporated in the battery to complement the boride compounds that can be used. Examples are: water/sodium hydroxide systems; alkali metal hydroxides such as lithium hydroxide; sodium hydroxide; potassium hydroxide; rubidium hydroxide; cesium hydroxide; tetraorganoammonium hydroxides of the general formula $R_4NOH$—where the R groups can be the same or different on the same molecule—such as tetramethylammonium hydroxide; and glycerin/water/boric acid or borates.

The above described anode materials or combination of materials may be used in a battery whose cathode is a suitable oxidizing agent. Among the suitable cathode materials are: cathodes which use molecular oxygen ($O_2$) such as direct air breathing electrodes; cathodes which include a oxidizing agent, e.g., any material that provides oxygen such as ferrates $MnO_2Cr_3KMnO_4$perhalates, perchlorate, chlorates, bromates, perbromates, iodates, periodates, hypochlorites chlorites, high valence metal halides, etc. In general one can use the halates of the formula $HAL_xOy_n$ where the oxidation state of the halogen (HAL) is from +1 to +7 and the number of oxygen atoms is such that the charge of the anion is usually −1 so the value of n is usually 1. Other materials may be based on halogens such as fluorine or high valency metal fluorides or chlorides materials such as $NiF_3$ or interhalogens such as $IF_5$ or $ClF_3$, etc. Non-aqueous systems may be used for halogen-based materials that are water sensitive. For example, such systems may use organic solvents that are conductive (or can be made conductive by the addition of enhancers).

An important feature of this chemistry is its ability to operate at ambient or moderate temperatures, avoiding the use of molten salts and allowing the batteries to be used in many applications such as consumer products. By establishing a desired reaction rate, one can make the current output suitable for the given application. This rate is determined by the combination of factors previously mentioned, the key ones being electrolyte composition, conductivity of the entire cell, the anode and cathode materials.

For example, highly alkaline aqueous systems (pH over 9.0 and preferably over 11.0) will provide a more rapid reaction, and, all other things being equal, if ionic species in the electrolyte are a factor limiting conductivity, higher pH will also increase conductivity and current. Those skilled in the art will also understand that a variety of current enhancers can be used as desired in a given application. For example, inert (non-participatory) materials such as graphite or more ionic electrolytes may be used. In some applications, it may be desirable to use a current enhancer that itself participates in oxidation, thus contributing, at least to some extent, to the current density as well as conductivity. In those cases, e.g., metallic borides (e.g., $NiB_2$, FeB, or other borides) may be added.

Those skilled in the art will understand, therefore, that the invention may be adapted to many different battery applications with differing volume limitations and current requirements.

One preferred way to provide the boride compound in a battery is to make a hydroxide (NaOH, LiOH) slurry (paste) that contacts the anode. The cathode may be an air breathing electrode. For example, the cathode may be a air-permeable plastic in contact with felt comprising a metal powder, such as nickel, platinum, or silver. Air oxidizes the metal powder, in a reaction that can be coupled with the boride-containing anode storage medium (e.g., the slurry described above). Electrosynthesis Corp. of Lancaster, N.Y. sells air breathing cathodes that are suitable for some applications.

In FIG. 1, a button battery 10 is the type of battery which is used in a hearing aid or other electronic device. Battery 10 includes a metal cap 12 providing the negative terminal, which covers a $TiB_2$/KOH paste 14 contained in a metal cup 16. The bottom of cup 16 includes very small air breathing holes 18 which allow air to reach air breathing cathode 20. Cathode 20 includes an air permeable plastic base 22 covered by a felt layer 24. Felt layer 24 is impregnated with a metal powder (e.g., Ag, Ni, Pt, etc.) that reacts with $O_2$ in the air. A metal (e.g. Ni) mesh 26 is also included in the felt layer to improve conductivity.

Alternative cathodes include electrodes based on $MnO_2$ as a redox material.

Selection of Boride and the Use of Halides

The choice of boride types may be limited by the electrolyte system. As the boride is oxidized during discharge an oxidized borate is formed. If this borate is not soluble the boride particles will become coated with an insulating layer of this borate and the reaction will shut down before all the boride is oxidized. As a result, the battery may 'die' well before all the energy has been extracted, thus undermining one of the important benefits of using borides, i.e., high energy. The use of fluorides or other halides in the electrolyte system will form soluble complexes with a wider variety of borates and metals.

The invention effectively oxidizes most or all of the borides in a one way reaction that yields greater energy in a system that is not rechargeable, and it allows for the use of an aqueous system and still with several oxidizing agents for cathodes.

A battery that uses a metal boride as an anode will ultimately convert this material to either a combination of the metal oxide and boron oxide; and/or the metal borate. For materials where the metal oxides or borates are soluble the discharge reaction is not hindered by the active particles becoming coated with a nonconductor and therefore not further useful in the discharge. One of the best candidate borides for this system is titanium diboride, which does indeed for non-conductive insoluble reaction products. Therefore to prevent this problem an electrolyte system using fluoride to complex the initial oxidation products results in a cell that produces both superior energy and power density verses a simple hydroxide electrolyte.

While the battery is discharging the reaction of the anode is (for $TiB_2$) as an example,

$$TiB_2 + 2O_2 = TiO_2 + B_2O_3 \tag{1}$$

and

$$2TiB_2 + 5O_2 = Ti(BO_2)_4 + TiO_2 \tag{2}$$

The titanium dioxide and titanium borate are both insoluble and will therefore hinder the completion of this reaction. However, if ions are available in the electrolyte that allows the formation of soluble complexes they will form. For example with fluoride below

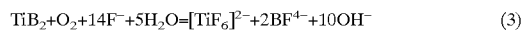

$$TiB_2 + O_2 + 14F^- + 5H_2O = [TiF_6]^{2-} + 2BF_4^- + 10OH^- \tag{3}$$

Notice that all the species are ionic and therefore soluble and capable of carrying charge. It is a further teaching that even though equation 3 stipulates 14 fluorides that the fluorides can be used several times since over time the fluoro complexes in the presence of base eventually turn into the products of equation I so that the net consumables are still those of equation 1. The hydrolysis reactions are as follows.

$$[TiF_6] + 4OH^- = TiO_2 H_2 O + 6F^- \tag{4}$$

$$2BF_4^- + 6OH^- = B_2O_3 + 3H_2O + 8F^- \tag{5}$$

As can be seen the addition of equations 3,4 and 5 yield equation 1.

Examples of Halide-containing Storage Media

EXAMPLE 1

A standard coin cell (2325) 23 mm, diameter 2.5 mm thickness is fitted with an Johnson Matthey GDE 1 0 1 gas diffusion electrode used as an standard Pt catalyzed air, electrode is placed in the cathode can with two 0.0625"diameter holes for air passage. Over this is placed a Nafion 117 membrane disk. A mixture containing 85% by TiB2 and 15% of a solution of 40% NAOH is prepared. 1.5 gms of this mixture was scaled into the anode compartment of the cell. A cyclic voltammagram (using an EG&G Model 273A Potentiostat) was run on the cell. The Open circuit voltage was 1.19 volts. The short circuit current was 35 rnilliarnps. Then a constant voltage of 1.0 was maintained. The initial current was 12 milliamps. This held for 12 minutes the current started to drop over the next 41 minutes to a level of 2.1 milliamps which was sustained for the next three hours with a final current of 1.9 milliamps at which point the test was terminated.

EXAMPLE 2

An identical air breathing coin cell as used in example I above was assembled. However 0.2 grams of NaF was added to the anode mixture and the cell sealed as before. A cyclic voltammagram was as before. The open circuit voltage was 1.30 volts and the short circuit current now jumped to 364 milliamps. At the constant voltage of 1.0 the current was now 77 milliamps. Further no "shoulder" occurred as before but a gentle decrease in the current to 69 millianps was observed over the four hour test at which time the test was ended.

As is readily apparent the addition of the fluoride made a substantial difference in the performance of the battery. This difference is very important in the applications that the battery will be suitable for. Since borides are a very high-energy source it is very important that this high-energy source be utilized in as many applications as possible. Since borides are high density $TiB_2$ for instance has a theoretical energy density of over 40,000-watt hours per liter. This is over four times than the theoretical for lithium and is higher than any non-nuclear battery available.

Using the above information it will be obvious to those skilled in the art what additional ions would be suitable to form complexes with the corresponding metal boride. For example chloride will also work in place of fluoride in the above example. However, chloride has a slightly less affinity to complex with Ti or B and therefore would not produce quite as good an improvement as shown in Example 2. Nevertheless the improvement may well be enough for many applications. Additionally, chloride are more economical than fluorides. The other halogens (Br and I) are also suitable.

Of course beside the sodium cation as used in sodium fluoride above any soluble form of fluoride that provides fluoride ions is suitable, such as $Li^+$, $K^+$, $NH_4^{+}$, $Cs^+$, $Ag^+$, and also quaternary ammonium salts ($RN_4^+F^-$) etc. Of course materials that bind or precipitate fluoride (Other than the boride itself) ions such as calcium are to be avoided. Of course if chloride is used then calcium is an acceptable component. Other suitable complexing agents are other anions such as sulfide $S^{-2}$, cyanide $CN^-$, thiocyanide $SCN^-$, cyanto $OCN^-$, etc. which enhance the solubility of either the metal or the boride moiety of the metal boride will also be apparent based on a simple example of the solubility's of the corresponding compounds. Further general chelating agents such as EDTA that would complex with several of the transition metal elements that the borides may be made from. This is important since mixtures of borides may also be used in the anode to achieve certain effects. For example nickel boride added to titanium boride could increase the conductivity of the cell. As the nickel boride is oxidized the nickel could be chelated by the EDTA or other similar chelating type agents thereby preventing intereference from insoluble nickel oxides or borates.

What is claimed is:

1. A battery comprising an anode and a cathode in electrical communication,
   the anode including an anodic medium comprising as a reduced species: a) boron; b) at least one reduced boron-containing compound; or c) both;
   the reduced species being oxidizable to at least one oxidized boron-containing compound in a reaction which yields an electric current, the oxidized boron-containing compound being soluble in said electrochemical storage medium as said battery is discharged.

2. The battery of claim 1 in which the anodic medium further comprises water.

3. The battery of claim 2 in which the reduced boron-containing compound is a boride.

4. The battery of claim 3 in which the anodic medium comprises at least one halide.

5. The battery of claim 4 in which the halide is fluoride.

6. The battery of claim 5 in which the anodic medium comprises an alkali fluoride.

7. The battery of claim 4 in which the halide is chloride.

8. The battery of claim 7 in which the halide is sodium or potassium chloride.

9. The battery of claim 5 or claim 6 in which the anodic medium further comprises chloride.

10. The battery of claim 3 in which the boride is conductive.

11. The battery of claim 3 in which the boride is a transition metal boride.

12. The battery of any one of claims 3, 4, 5, or 7 in which the reduced boron-containing compound is titanium diboride.

13. The battery of any one of claims 3, 4, 5, or 7 in which the reduced boron-containing compound is vanadium diboride.

14. A battery according to any one of claims 3, 4, 5, or 7 in which the cathode comprises a structure that is exposed to oxygen.

15. The battery of claim 14 in which the cathode structure is exposured to air.

16. The battery of claim 14 in which cathode is exposed to an aqueous electrolyte, and oxygen is reduced to $—OH^-$.

17. The battery of any one of claims 3, 4, 5, or 7 in which in which the cathode comprises a structure that is exposed to oxygen, and the reduced boron containing compound is titanium diboride, or vanadium diboride, or both.

18. The battery of claim 1 or claim 3 in which the anodic medium further comprises a borohydride in addition to said boron or said reduced boron-containing compound.

19. The battery of claim 1 or claim 3 in which the anodic medium further comprises a metallic boride.

20. The battery of claim 19 in which the metallic boride is FeB or $NiB_2$.

21. The battery of claim 1 or claim 3 in which the anodic medium further comprises a conductivity enhancer which itself is oxidized to provide addition current during oxidation of said reduced boron-containing compound.

22. The battery of claim 1 in which the anodic medium further comprises graphite.

23. The battery of claim 1 in which the anodic medium further comprises an inert conductivity enhancer.

24. The battery of claim 3 in which the anodic medium comprises a combination of borides.

25. The battery of claim 5 in which the oxidized boron-containing compound is a boron halide or a boron oxyhalide.

26. The battery of claim 1 in which the oxidized boron-containing compound is a borate or polyborate.

27. The battery of claim 2 in which the oxidized boron-containing compound is conductive.

28. The battery of claim 3 in the reduced boron- containing compound is an aluminum boride.

29. The battery of claim 3 in which the boride is a boride selected from the list in table 1.

30. The battery of any one of claims 4, 5, or 7 in which the anodic medium further comprises EDTA, in addition to said boron or reduced boron-containing compound.

31. The battery of claim 3 in which the oxidized boron-containing compound includes a metal oxide and a borate.

32. The battery of claim 3 in which the oxidized boron-containing compound contains a combination of corresponding metal oxides, halides and oxyhalides.

33. The battery of claim 3 in which the anodic medium has a pH above 8.5.

34. The battery of claim 33 in which the anodic medium has a pH above 11.0.

35. A battery according to any one of claims 3, 4, 5, or 7 in which the cathode comprises an oxygen-containing oxidizing compound.

36. A battery according to claim 35 in which the oxidizing compound is selected from ferrates, $MnO_2$, $CrO_3$, $KMnO_4$, $LICoO_2$, NiOOH, peroxides, perhalates, perchlorate, chlorates, bromates, perbromates, iodates, periodates, hypochlorites chlorites.

37. A battery according to claim 1 in which the cathode comprises a non-oxygen containing oxidizing compound.

38. A battery according to claim 37 in which the non-oxygen compound is an interhalogen.

39. A battery according to claim 37 in which the non-oxygen compound is a metal-halide in which the metal can be reduced to a lower valence.

40. A method of generating a current by contacting a load to the battery of claim 1.

41. The battery of any one of claims 3, 4, 5, or 7 in which in which the cathode comprises a structure that is exposed to oxygen, and the reduced species is oxidizable to a mixture of titanium diboride and vanadium diboride.

42. The battery of claim 6 in which the anodic medium comprises sodium fluoride.

* * * * *